United States Patent [19]

Yamaya et al.

[11] Patent Number: 5,106,937
[45] Date of Patent: Apr. 21, 1992

[54] THERMOSETTING RESIN FROM PENTA ARYLENE BIS MALEIMIDE

[75] Inventors: Norimasa Yamaya; Shoji Tamai, both of Kanagawa; Masahiro Ohta, Fukuoka; Akihiro Yamaguchi, Kanagawa, all of Japan

[73] Assignee: Mitsui Toatsu Chemicals, Inc., Tokyo, Japan

[21] Appl. No.: 601,358

[22] Filed: Oct. 23, 1990

[30] Foreign Application Priority Data

Apr. 11, 1990 [JP] Japan ................................. 2-094153
Apr. 11, 1990 [JP] Japan ................................. 2-094154
Aug. 10, 1990 [JP] Japan ................................. 2-210245

[51] Int. Cl.$^5$ ............................................. C08G 73/12
[52] U.S. Cl. ................................. 528/170; 528/125; 528/128; 528/171; 528/321; 528/322
[58] Field of Search ............... 528/170, 125, 128, 171, 528/322, 321

[56] References Cited

U.S. PATENT DOCUMENTS 4,526,838  7/1985  Fujioka et al. ...................... 528/170
4,959,443  9/1990  Yamaya et al. ..................... 528/170

*Primary Examiner*—Harold D. Anderson
*Attorney, Agent, or Firm*—Burns, Doane, Swecker & Mathis

[57] ABSTRACT

Disclosed is a composition for forming a thermosetting resin having excellent impact resistance and toughness. The composition comprises a bismaleimide compound represented by formula (I):

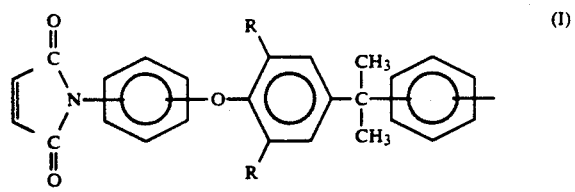

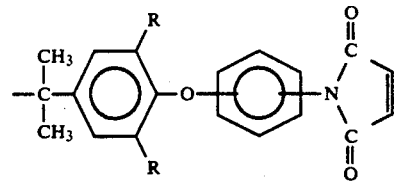

wherein R is a hydrogen atom or methyl, and an amine compound represented by formula (II):

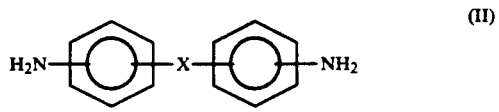

wherein X is a radical selected from the group of divalent hydrocarbons having from 1 to 10 carbon atoms, hexafluorinated isopropylidene, carbonyl, thio, sulfinyl, sulfonyl, oxo,

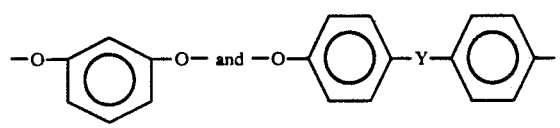

or by formula (III)):

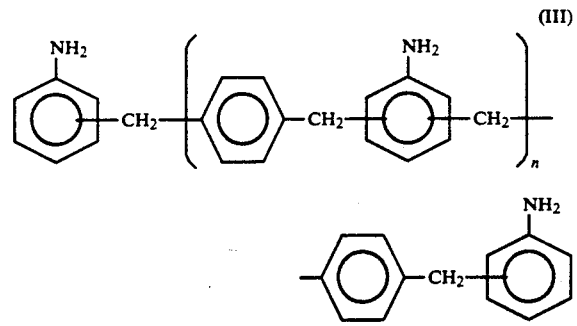

where in n is an integer of 0 to 50. Also disclosed is a process for preparing the composition.

14 Claims, No Drawings

THERMOSETTING RESIN FROM PENTA ARYLENE BIS MALEIMIDE

BACKGROUND OF THE INVENTION

The present invention relates to a thermosetting resin forming composition. The composition has good storage stability and provides the resulting thermosetting resin with excellent mechanical strength and low water absorption, without impairing heat resistance.

Thermosetting resins having an imide structure have traditionally provided excellent performance properties such as electrical insulation, heat resistance and dimensional stability of molded articles. Therefore, they have been widely utilized in many industrial fields.

However, although thermosetting resin forming compositions obtained by thermally polymerizing only an aromatic base bismaleimide compound have provided materials which exhibit excellent heat stability, they unfortunately have a disadvantage of exhibiting extreme brittleness and poor flexibility.

One method for addressing this disadvantage relates to the use of a thermosetting resin forming composition composed of an aromatic base bismaleimide compound and an aromatic base diamine compound. For example, a polyaminobismaleimide resin composed of N,N'-4,4'-disphenylmethanebismaleimide and 4,4'-diaminodiphenylmethane (Trade Mark; Kelimide, a product from Rhone Poulenc Co.) has been widely used commercially as an impregnating varnish, a laminated sheet and a molded article as described in Japanese Patent Publication No. 23250 (1971). The above thermosetting resin forming composition, however, does not provide satisfactory impact resistance and flexibility.

Furthermore, when such a thermosetting resin forming composition is used as a base material of electrical and electronic parts, the resulting parts exhibit high water absorption which adversely effects processability and electrical properties.

Also, when such a thermosetting resin forming composition is used for laminated sheets, the composition exhibits poor solubility in low boiling point solvents and inferior storage stability of the resin solution prior to preparation of the prepreg of glass cloth.

SUMMARY OF THE INVENTION

The object of the present invention is to provide a composition for forming a thermosetting resin having excellent mechanical strength, particularly in terms of impact strength and toughness, and low water absorption.

Another object of the present invention is to provide a thermosetting resin forming composition having good storage stability in a dissolved state and which provides the resultant thermosetting resin with excellent mechanical strength.

The above objects can be effectively accomplished by using the thermosetting resin forming composition and a process for its preparation described below. Specifically, the objects can be achieved by a thermosetting resin forming composition comprising a bismaleimide compound represented by formula (I):

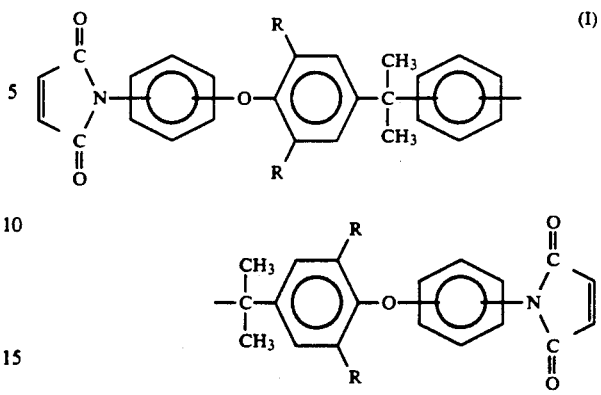

wherein R is a hydrogen atom or methyl, and a diamine compound represented by formula (II):

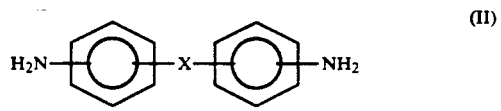

wherein X is a radical selected from the group of a divalent hydrocarbon having from 1 to 10 carbon atoms, hexafluorinated isopropylidene, carbonyl, thio, sulfinyl, sulfonyl oxo —O— —O— and —O— —Y— —O—, wherein Y is a direct bond or a radical selected from the group of a divalent hydrocarbon having from 1 to 10 carbon atoms, hexafluorinated isopropylidene, carbonyl, thio, sulfinyl, sulfonyl and oxo.

The invention also provides a thermosetting resin forming composition comprising a bismaleimide compound represented by above formula (I) and an aromatic amine represented by formula (III):

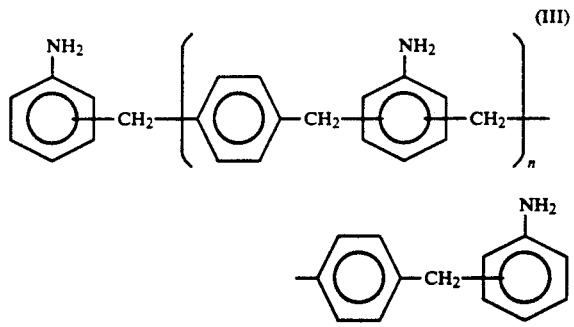

wherein n is an integer of from 0 to 50.

The preparation process of a thermosetting resin forming composition according to the invention comprises mixing a bismaleimide compound represented by formula (I) with an amine compound represented by formulae (II) or III), either in the absence or presence of an organic solvent, and forming a prepolymer by conducting heat treatment at a temperature of from 70° to 220° C.

DETAILED DESCRIPTION OF THE PREFERRED EMBODIMENTS

The bismaleimide compound represented by the formula (I) can be prepared by a dehydration-condensation reaction of a diamine compound represented by formula (IV):

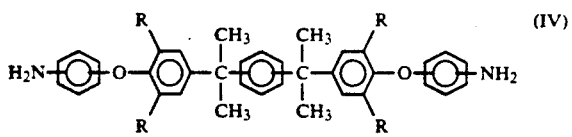

wherein R is a hydrogen atom or methyl, with maleic anhydride. Specific diamine compounds are disclosed in detail in U.S. application Ser. No. 601,424 filed concurrently herewith, the contents of which are hereby incorporated by reference Examples include 1,4-bis[4-(4-aminophenoxy)-d,d-dimethylbenzyl]-benzene, 1,3-bis[4-(4-aminophenoxy)-d,d-dimethylbenzyl]-benzene, 1,3-bis[4-(3-aminophenoxy)-d,d-dimethylbenzyl]-benzene, 1,4-bis[4-(3-aminophenoxy)-d,d-dimethylbenzyl]-benzene, 1,4-bis[4-(4-aminophenoxy)-3,5-dimethyl-d,d-dimethylbenzyl]-benzene, 1,3-bis[4-(4-aminophenoxy)-3,5-dimethyl-d,d-dimethylbenzyl]benzene, 1,4-bis[4-(3-aminophenoxy)-3,5-dimethyl-d,d-dimethylbenzyl]benzene and 1 3-bis[4-(3-aminophenoxy)-3,5-dimethyl-d,d-dimethylbenzyl]benzene. Specific bismaleimide compounds obtained by the reaction of such diamine compounds with maleic anhydride are described in U.S. patent application Ser. No. 601,424 filed concurrently herewith, the contents of which are hereby incorporated by reference.

According to the present invention, exemplary bismaleimide compounds represented by the formula (I) include the bismaleimide compounds of formula (V):

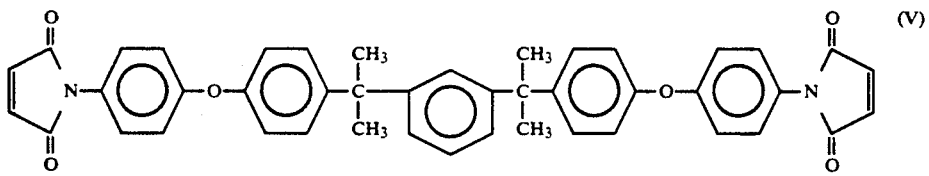

By using the above bismaleimide compound represented by the formula (I), a thermosetting resin forming composition which provides excellent impact resistance and toughness can be obtained.

The amine compound used according to the present invention is a diamine compound of formula (II), or an aromatic amine of formula (III). A composition comprising a diamine compound of formula (II) and the bismaleimide compound of formula (I), provides a resulting thermosetting resin which has excellent heat resistance, impact resistance and toughness. The composition is therefore expected to be useful in a wide variety of electric and electronic parts, various structural members and sliding parts, and should have a remarkable effect in those industries.

Exemplary diamine compounds represented by formula (II) are the compounds having a structure of formula (VI) and formula (VII):

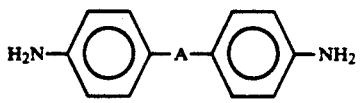

wherein A is a radical selected from the group of divalent hydrocarbons having from 1 to 10 carbon atoms, hexafluorinated isopropylidene, carbonyl, thio, sulfinyl, sulfonyl and oxo;

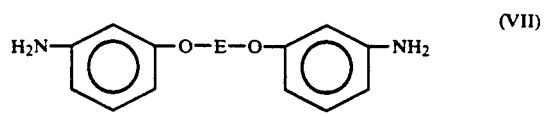

wherein E is a divalent radical selected from

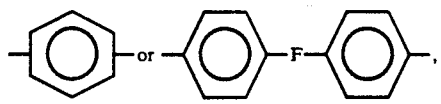

wherein E is a direct bond or a from the group of a divalent hydrocarbons having from 1 to 10 carbon atoms, hexafluorinated isopropylidene, carbonyl, thio, sulfinyl, sulfonyl and oxo.

Examples of diamine compounds represented by formula (VI) include, 4,4'-diaminodiphenylmethane, 1,1-bis(4-aminophenyl)ethane, 1,2-bis(4-aminophenyl)ethane, 4,4'-diaminodiphenyl ketone, 4,4'-diaminodiphenyl thioether, 4,4'-diaminodiphenylsulfone, 4,4'-diaminodiphenyl ether, 2,2'-bis(4-aminophenyl)propane, and 2,2'-bis(4-aminophenyl)hexafluoropropane.

Exemplary diamine compounds represented by formula (VII) include 1,3-bis(3-diaminophenoxy)benzene, bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfoxide, bis[4-(3-aminophenoxy)phenyl]sulfone and bis[4-(3-aminophenoxy)phenyl]ether. These diamine compounds may be used alone or in combinations.

A composition comprising a bismaleimide compound of formula (I) and a diamine compound of formula (VI) can provide a resulting thermosetting resin with excellent mechanical strength, particularly impact resistance, and low-water absorption.

The composition comprising a bismaleimide compound of formula (I) and a diamine compound of formula (VII) can provide a resulting thermosetting resin with excellent impact resistance and toughness while maintaining the heat resistance common to thermosetting resins having an imide structure.

The aromatic amines represented by formula (III) are described in detail in Japanese Patent Laid-Open Publication Nos. 95125 1989) and 123828 (1989). For example, the aromatic amine can be prepared by reacting aniline with an aralkyl derivative represented by formula (VIII):

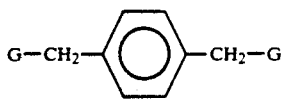

(VIII)

wherein G is a halogen, hydroxy or alkoxy.

The aromatic amine of formula (III) will typically have an average molecular weight of from 288 to 2200, and a preferred value for n is in the range of 0 to 10.

A composition comprising a bismaleimide compound of formula (I) and an aromatic amine of the formula (III) can provide good storage stability in solution and can further provide a resulting thermosetting resin with excellent heat resistance, impact strength and flexibility. The composition is expected to enjoy wide use such as in electric and electronic parts, various structural members and sliding parts, and have a remarkable effect in industry.

The proportion of the amount of bismaleimide compound of formula (I) to diamine compound of formula (II) is from 0.1 to 1.2 moles, preferably from 0.2 to 0.8 mole of the diamine compound per mole of the bismaleimide compound. If the proportion of diamine is too low, good impact resistance and flexibility for the resulting cured product will likely not be obtained. On the other hand, if the proportion is too high, the heat resistance of the cured product will be adversely affected.

The amount of aromatic amine represented by formula (III) is generally from 5 to 50 parts by weight, preferably from 5 to 30 parts by weight per 100 parts by weight of bismaleimide compound of formula (I).

If the proportion of aromatic amine is too low, the resulting cured product will likely be very brittle such that satisfactory flexural strength will not be obtained. On the other hand, if the proportion of aromatic amine is too high, the heat resistance of the cured product will be adversely affected.

The thermosetting resin forming composition can be obtained from the bismaleimide compound of formula (I) and the amine compound of formula (II) or formula (III) by various procedures as described below. For example, (1) the bismaleimide compound and the amine compound can be ground and mixed in a solid-solid condition or in a solid-liquid condition, or the mixture thus obtained can be converted to a prepolymer by heat treatment and then ground to prepare pellets or powder. Preferred heat treatment carries out partial curing to the stage of prepolymer. The heat treatment condition will be generally at temperatures of 70° to 220° C. for 5 to 240 minutes, preferably at 80° to 200° C. for 10 to 180 minutes. Also, (2) the bismaleimide compound and the amine compound can be dissolved in an organic solvent and poured into a poor solvent. The resulting precipitate is filtered, dried and converted to pellets or powder. Alternatively, both compounds can be dissolved in an organic solvent, heat-treated to conduct partial curing to the stage of prepolymer and poured into a poor solvent. The resulting precipitate can then be filtered, dried and converted to pellets or powder. Although somewhat different depending upon the type of organic solvent, the heat treatment conditions will be substantially the same as those described with respect to (1).

The solvent should not react with both components, and preferably is a good solvent for both components. Examples of suitable solvents include halogenated hydrocarbons such as methylene chloride dichloroethane and trichloroethylene; ketones such as acetone, methyl ethyl ketone, cyclohexanone and diisopropyl ketone; ethers such as tetrahydrofuran, dioxane and methyl cellosolve; aromatic compounds such as benzene, toluene and chlorobenzene; and non-protonic polar solvents such as acetonitrile, N,N-dimethylformamide, N,N-dimethylacetamide, dimethyl sulfoxide, N-methyl-2-pyrrolidone and 1,3-dimethyl-2-imidazolidinone.

If necessary, additional components can be added to the thermosetting resin forming composition of the present invention, so long as the objects of the invention are not impaired. These include curing accelerators such as radical polymerization initiators (e.g., an azo compound or an organic peroxide), or an ionic catalyst (e.g., a tertiary amine, a quaternary ammonium salt, an imidazole or a boron trifluorideamine salt); powdery reinforcing materials and fillers such as a metal oxide (e.g., aluminum oxide or magnesium oxide), a metal hydroxide (e.g., aluminum hydroxide), a metal carbonate (e.g., calcium carbonate or magnesium carbonate), diatomaceous earth powder, basic magnesium silicate, calcined clay, finely powdery silica, melted silica, crystalline silica, carbon black, kaolin, finely powdery mica, quartz powder, a metal hydroxide (e.g., graphite), asbestos, molybdenum disulfide or antimony trioxide; fibrous reinforcing materials and fillers such as an inorganic fiber (e.g., glass fiber, rock wool, ceramic fiber, alumina fiber or potassium titanate fiber), or an organic fiber (e.g., carbon fiber or an aromatic polyamide); and for the purpose of improving properties of a resin of a final coating film, adhesive layer or molded resin article, a synthetic resin can be blended therewith. Examples of suitable synthetic resins include thermosetting resins such as a phenol resin, an epoxy resin, a melamine resin and a silicone resin, polyamide, polycarbonate, polysulfone, polyether sulfone, polyether ether ketone, modified polyphenylene oxide, polyphenylene sulfide, polyether imide and a fluorine-containing resin.

The thermosetting resin forming composition of the present invention can be molded using known molding methods such as compression molding, transfer molding, extrusion molding or injection molding, and then put to practical use.

The present invention will be described in further detail below using synthesis examples, examples and comparative examples. However, these examples should not be construed as in any way limiting the invention.

In the examples below, the physical properties of thermosetting resin forming compositions were measured by the following procedures.

For GPC Analysis, LC-6A made by Shimadzu Seisakusho Ltd. was used.

Bending Strength and Flexural Modulus were measured in accordance with ASTM-D-790.

Izod Impact Strength (no notch) was measured in accordance with ASTM-D-256.

Starting Temperature of Thermal Decomposition was the temperature at which weight decrease begins was measured at a temperature rise rate of 10° C./minute in air in accordance with the TGA method.

Water Absorption was measured in accordance with ASTM D-570-63.

Softening Point was measured in accordance with JIS K-2548 (a ring and ball softening point method).

Heat distortion temperature was measured in accordance with ASTM D-648.

0.5% Weight Loss Temperature was the temperature when 0.5% by weight of loss is indicated in the air at a temperature rise rate of 10° C./minute in TGA method.

To determine the storage stability of a resin solution, a resin composition (before heat curing) was dissolved in N-methyl pyrrolidone so as to obtain resin concentration of 50% by weight. After storing the resin solution for 30 days at room temperature, the appearance of the resin solution was visually observed.

Synthesis of Bismaleimide Compound (I)

Synthesis Example 1

A reaction vessel equipped with a stirrer, thermometer, reflux condenser, water separator and a dropping funnel was charged with 265 g (2.7 mole) of maleic anhydride, 16 g of p-toluenesulfonic acid and 1500 ml of toluene and heated to reflux toluene. A solution conta 528 g (1.0 mole) of 1,3-bis[4-(4-aminophenoxy)-d,d-dimethylbenzyl]benzene in 1000 ml of toluene was added dropwise over 7 hours. After the addition was completed, the reaction mixture was aged by heating for an additional 2 hours. Water formed by the reaction was collected in the water separator from the initiation of dropwise addition to the termination of aging. After the reaction was completed, the reaction mixture was cooled to 70° C. and 1000 ml of warm water was added and stirred for 30 minutes at the same temperature. After standing, the mixture was separated into two layers. The lower layer (aqueous layer) was removed, and another 1000 ml of warm water was added for further washing.

The toluene solution in the upper layer was concentrated in vacuum at a temperature range of not higher than 130° C. to obtain 680 g of crude, 1,3-bis[4-(4-maleimidephenoxy)-d,d-dimethylbenzyl]benzene as a transparent red-brown resin. The yield was quantitative. The purity was 91% by HLC.

The crude product was purified by recrystallization. A pure product was obtained as a light yellow powder which had a melting point of 72°–75° C.

Elementary analysis ($C_{44}H_{36}N_2O_6$) was as follows:

|  | C | H | N |
|---|---|---|---|
| Calculated (%) | 76.70 | 5.27 | 4.07 |
| Found (%) | 76.20 | 5.43 | 4.22 |

Synthesis Example 2

A reaction vessel equipped with a stirrer, thermometer, reflux condenser, water separator and a dropping funnel was charged with 26.5 g (0.27 mole) of maleic anhydride, 1.6 g of p-toluenesulfonic acid and 150 ml of toluene were charged and heated to reflux toluene. A solution containing 52.8 g (0.1 mole) of 1,3-bis[4-(3-aminophenoxy)-d,d-dimethylbenzyl]benzene in 100 ml of toluene was added dropwise over 7 hours. After the addition was completed, the reaction mixture was aged by heating for an additional 2 hours. Water formed by the reaction was collected in the water separator from the initiation of dropwise addition to the termination of aging. After the reaction was completed, the reaction mixture was cooled to 70° C. and 100 ml of warm water was added and stirred for 30 minutes at the same temperature. After standing, the mixture was separated into two layers. The lower layer (aqueous layer) was removed, and another 100 ml of warm water was added for further washing.

The toluene solution in the upper layer was concentrated in vacuum at a temperature range of not higher than 130° C. to obtain 68.2 g of crude 1,3-bis[4-(3-maleimidephenoxy)-d,d-dimethylbenzyl]benzene as a transparent red-brown resin. The yield was quantitative. The purity was 96.3% by HLC.

The crude product was purified by column chromatography. A pure product was obtained as a light yellow powder.

Elementary analysis ($C_{44}H_{36}N_2O_6$) was as follows:

|  | C | H | N |
|---|---|---|---|
| Calculated (%) | 76.70 | 5.27 | 4.07 |
| Found (%) | 76.41 | 5.44 | 4.01 |

Mass spectrum:
M/Z; M⁺ 688, 673, 408

Synthesis Examples 3–5

Bismaleimide compounds were prepared by carrying out the same procedures as described in connection with Synthesis Examples 1 and 2.

The melting point and results of elementary analysis are summarized in Table 1.

TABLE 1

| Synthesis Example | Compound | Melting Point (°C.) | Elementary Analysis (%) | | | |
|---|---|---|---|---|---|---|
|  |  |  |  | C | H | N |
| 3 | 1,4-bis[4-(4-maleimidephenoxy)-3,5-dimethyl-α,α-dimethylbenzyl]benzene | 232.5~ 235 | calc. found | 77.38 77.05 | 5.95 6.08 | 3.76 3.66 |
| 4 | 1,4-bis[4-(4-maleimidephenoxy)-α,α'-dimethylbenzyl]benzene | 214~ 216 | calc. found | 76.70 76.02 | 5.27 5.51 | 4.07 4.18 |
| 5 | 1,4-bis[4-(3-maleimidephenoxy)-α,α'-dimethylbenzyl]benzene | 192~ 193 | calc. found | 76.70 76.66 | 5.27 5.33 | 4.07 4.18 |

EXAMPLES 1–3 AND COMPARATIVE EXAMPLE 1

To a stainless steel reactor equipped with a stirrer, reflux condenser and a nitrogen inlet tube, 1,3-bis[4-(4-maleimidephenoxy)-d,d-dimethylbenzyl]benzene obtained in Synthesis Example 1 and 4,4'-diaminodiphenylmethane were charged respectively in the mole ratios set forth in Table 2. The mixture was heat-melted at 180° C. for 20 minutes, defoamed at 150° C. for 30 minutes under reduced pressure of 10 to 15 mm Hg, and cooled to room temperature. The obtained composition was a transparent brown glassy solid. A mold was heated to 180° C. and the resin composition was filled into the mold with simultaneous heat-melting. The mold was pressed under a pressure of 50 kg/cm² at 200° C. for 30 minutes. The molded products were taken out of the mold and further post-cured in a oven at 250° C. for 4 hours to obtain a cured specimen having dimensions of 127 mm in length, 12.7 mm in width and 6.4 mm in thickness.

The Izod impact strength, bending strength, flexural modulus and thermal starting temperature of thermal decomposition of the specimens were measured. The results are set forth in Table 2.

COMPARATIVE EXAMPLE 2

N,N',4,4'-diphenylmethanebismaleimide and 4,4'-diamino-diphenylmethane were used in a mole ratio of 2/1 as set forth in Table 2. The same procedures as described in Examples 1 to 3 were carried out. The dried at 110° C. for 20 minutes and successively at 130° C. for 30 minutes. The dried product was ground with a mortar and passed through a sieve of 60 mesh to obtain a polyaminobismaleimide-type thermosetting resin forming composition. The composition was processed by the same procedures as described in connection with Examples 1-3. The results obtained are set forth in Table 3.

TABLE 3

| | Resin Composition | | Mole Ratio (A/B) | Izod Impact Strength (No. Notch) (kg · cm/cm) | Bending Strength (kg/mm$^2$) | Flexural Modulus (kg/mm$^2$) | 0.5% wt. loss Temperature (°C.) | Water Absorption (%) |
|---|---|---|---|---|---|---|---|---|
| | Bismaleimide Compound (B) | Diamine Compound (A) | | | | | | |
| Example 4 | 1,3-bis[4-(4-maleimidephenoxy)-α,α-dimethyl)benzyl]benzene | 4,4'-diamino-diphenyl ether | 0.5 | 35 | 15.5 | 338 | 360 | 0.31 |
| Example 5 | 1,3-bis[4-(4-maleimidephenoxy)-α,α-dimethyl)benzyl]benzene | 4,4'-diamino-diphenyl methane | 0.5 | 36 | 16.1 | 318 | 361 | 0.33 |
| Example 6 | 1,4-bis[4-(4-maleimidephenoxy)-3,5-dimethyl-α,α-methylbenzyl]benzene | 4,4'-diamino-diphenyl methane | 0.5 | 34 | 15.1 | 340 | 347 | 0.29 |
| Example 7 | 1,4-bis[4-(4-maleimidephenoxy)-α,α-dimethylbenzyl]benzene | 4,4'-diamino-diphenyl methane | 0.5 | 33 | 15.7 | 350 | 370 | 0.33 |
| Example 8 | 1,4-bis[4-(3-maleimidephenoxy)-α,α-dimethylbenzyl]benzene | 4,4'-diamino-diphenyl methane | 0.5 | 32 | 15.3 | 342 | 348 | 0.32 | obtained results are set forth in Table 2.

COMPARATIVE EXAMPLE 3

Kelimide-601 (manufactured by Nippon Polyimide Co.) was used as the resin compound. The procedures described in Example 1-3 were repeated. The results are set forth in Table 2.

EXAMPLES 9-11

A stainless steel reaction vessel equipped with a stirrer, reflux condenser and a nitrogen inlet tube, was charged with the powder obtained by previously mixing 1,3-bis[4-(4-maleimidephenoxy)-d,d-dimethylbenzyl]benzene (hereinafter abbreviated as p-BAC-M-

TABLE 2

| | Resin Composition | | Mole Ratio (A/B) | Izod Impact Strength (No. Notch) (kg · cm/cm) | Bending Strength (kg/mm$^2$) | Flexural Modulus (kg/mm$^2$) | 0.5% wt. loss Temperature (°C.) | Water Absorption (%) |
|---|---|---|---|---|---|---|---|---|
| | Bismaleimide Compound (B) | Diamine Compound (A) | | | | | | |
| Example 1 | 1,3-bis[4-(4-maleimidephenoxy)-α,α-dimethylbenzyl]benzene | 4,4'-diamino-diphenyl-methane | 0.3 | 34 | 14.7 | 333 | 349 | 0.33 |
| Example 2 | 1,3-bis[4-(4-maleimidephenoxy)-α,α-dimethylbenzyl]benzene | 4,4'-diamino-diphenyl-methane | 0.5 | 35 | 15.1 | 328 | 350 | 0.31 |
| Example 3 | 1,3-bis[4-(4-maleimidephenoxy)-α,α-dimethylbenzyl]benzene | 4,4'-diamino-diphenyl-methane | 1.0 | 34 | 14.9 | 330 | 348 | 0.31 |
| Comp. Ex. 1 | 1,3-bis[4-(4-maleimidephenoxy)-α,α-dimethylbenzyl]benzene | none | 0 | 2 | 5.2 | 460 | 412 | 0.90 |
| Comp. Ex. 2 | N,N',4,4'-diphenylmethane-bismaleimide | 4,4'-diamino-diphenyl-methane | 0.5 | 11 | 9.2 | 372 | 359 | 0.89 |
| Comp. Ex. 3 | Kelimide 601 | | | 9 | 8.1 | 342 | 366 | 0.90 |

EXAMPLES 4-8

To a stainless steel reactor equipped with a stirrer, reflux condenser and a nitrogen inlet tube, one of the bismaleimide compounds obtained by Synthesis Examples 1-3 and the diamine compound set forth in Table 3 were charged respectively in the mole ratio set forth in Table 3. To the mixture, N-methyl-2-pyrrolidone was added so as to obtain a resin concentration of 55% by weight and heated at 150° C. for 50 minutes. A varnish like solution was obtained and poured into water. The precipitate was filtered, washed with water and dried in hot air at 80° C. for 15 hours. The product was further BMI) and 1,3-bis(3-aminophenoxy)benzene in a mole ratio as set forth in Table 4. The powder was heat-melted at 180° C. and reacted for 20 minutes. Thereafter, the reaction mixture was cooled to room temperature to obtain reaction product which was a transparent brown glassy solid. The solid was ground to obtain a partially cured thermosetting resin forming composition as a yellow-fine powder.

A mold which was previously heated to 180° C. was filled with the composition and subjected to simultaneous heat-melting. The mold was pressed under a pressure of 50 kg/cm$^2$ at 200° C. for 30 minutes. The molded product was removed from the mold after cooling to room temperature and further post-cured in a hot air oven at 250° C. for 4 hours to obtain specimens for Izod impact strength and flexural testing. The Izod impact strength test (unnotched) and flexural test were conducted in accordance with JIS K-6911. The thermal decomposition temperature was also measured in air at a temperature rise rate of 10° C./min. The results are set forth in Table 4.

EXAMPLE 12

To a reaction vessel equipped with a stirrer, reflux condenser and nitrogen inlet tube, p-BAC-M-BMI and 1,3-bis(3-aminophenoxy)benzene were charged in the mole ratio set forth in Table 4, and N-methyl-2-pyrrolidone was added in an amount so as to obtain a resin concentration of 55% by weight. After dissolving both components, the solution was reacted at 130° C. for 50 minutes. The transparent brown varnish which was obtained was added dropwise to water while stirring. The precipitate which formed was filtered, washed with water and dried with hot air at 80° C. for 15 hours. The product was further dried at 110° C. for 20 minutes and 130° C. for 20 minutes, and thereafter ground to obtain a thermosetting resin forming composition. The composition was processed using the same procedures described in connection with Examples 9-11. The results are set forth in Table 4.

EXAMPLES 13-16 AND COMPARATIVE EXAMPLES 4-5

The diamine compounds and bismaleimide compounds set forth in Table 4 were mixed in the ratios set forth Table 4. Thereafter, the same procedures described in connection with Examples 9-11 were carried out. The results are set forth in Table 4.

ous hydrochloric acid solution were charged, and the temperature was increased while stirring under a nitrogen stream. Distilled water was removed by the water separator, and the mixture was heated to the refluxing temperature of aniline. The reaction was carried out for 15 hours under refluxing. After the reaction was completed, the reaction mixture was cooled to 140° C., poured into 1600 g of 18% aqueous sodium hydroxide solution, and 1000 g of toluene was added while stirring to complete neutralization. After standing, the mixture was separated into two layers. The lower layer was removed by separation, and washing with water and the separation of layers were repeated. The obtained oily layer was concentrated in vacuum to recover toluene and unreacted aniline.

The residue was the aromatic amine (III-a), a transparent light yellow oil, having the following characteristics:

Yield: 442 g
Composition by GPC analysis:
Value of n in the formula (III)

$$n = 0: 76\%, \quad n = 1: 19\%$$
$$n = 2: 4\%, \quad n \geq 3: 1\%.$$

Average molecular weight : 350
Amine value : 0.65 g/100 g
Synthesis Example 4

558 g of aniline (6 mole) was charged to reaction vessel equipped with a water separator, and the temperature was increased under a nitrogen stream. When the temperature reached 150° C., 350.2 g (2 mole) of d,d '-dichloro-p-xylene was added by portions while avoiding a rapid increase of the internal temperature. After the addition was completed, aging was conducted at

TABLE 4

| | Resin Composition | | Mole Ratio (A/B) | Izod Impact Strength (No. Notch) (kg · cm/cm) | Bending Strength (kg/mm$^2$) | Flexural Modulus (kg/mm$^2$) | Starting Temp. of Thermal Decomposition |
|---|---|---|---|---|---|---|---|
| | Bismaleimide Compound (B) | Diamine Compound (A) | | | | | |
| Example 8 | p-BACM-BMI* | 1,3-bis(3-aminophen-oxy)benzene | 0.2/1.0 | 26 | 12.2 | 420 | 364 |
| Example 9 | p-BACM-BMI* | 1,3-bis(3-aminophen-oxy)benzene | 0.5/1.0 | 32 | 14.7 | 346 | 355 |
| Example 10 | p-BACM-BMI* | 1,3-bis(3-aminophen-oxy)benzene | 0.8/1.0 | 25 | 13.0 | 336 | 350 |
| Example 11 | p-BACM-BMI* | 1,3-bis(3-aminophen-oxy)benzene | 0.5/1.0 | 30 | 14.6 | 340 | 352 |
| Example 12 | p-BACM-BMI* | 2,2-bis[4-(3-amino-phenoxy)phenyl]propane | 0.5/1.0 | 31 | 13.7 | 341 | 352 |
| Example 13 | p-BACM-BMI* | 4,4'-bis(3-aminophen-oxy)biphenyl | 0.5/1.0 | 30 | 14.1 | 350 | 351 |
| Example 14 | p-BACM-BMI* | bis[4-(3-aminophen-oxy)phenyl]sulfide | 0.5/1.0 | 30 | 14.2 | 348 | 351 |
| Example 15 | p-BACM-BMI* | bis[4-(3-aminophen-oxy)phenyl]sulfone | 0.5/1.0 | 27 | 14.2 | 345 | 355 |
| Comp. Ex. 4 | N,N',4,4'-diphenylmethane-bismaleimide | 4,4'-diaminodiphenyl-methane | 0.5/1.0 | 9 | 8.6 | 352 | 330 |
| Comp. Ex. 5 | Kelimide - 1050 | ** | | 11 | 8.6 | 352 | 333 |

(Note):
*1,3-Bis[4-(4-maleimidephenoxy)-α,α-dimethylbenzyl]benzene.
**Manufactured by Nippon Polyimide Co.

Synthesis of aromatic amine (III)

Synthesis Example 3

To a reaction vessel equipped with a water separator, 149.0 g 16 mole) of aniline, 280.2 g 1.6 mole) of -d,d'-dichloro-p-xylene and 175.2 g (4.8 mole) of 35% aque- 210° C. for 10 hours. After the reaction was completed, the reaction mixture was neutralized, washed with water, separated from the water layer and concentrated using the same procedures conducted in connection with Synthesis Example 3 to obtain aromatic amine (III
- b) as a transparent light yellow solid having the following characteristics:

Yield : 460 g
Composition by GPC:
Value of n in the formula (III)

$n = 0$: 36%,  $n = 1$: 22%
$n = 2$: 14%,  $n = 3$: 9%,
$n = 4$: 6%,  $n \geq 5$: 13%

Average molecular weight : 650

Softening point : 56° C.
Amine value : 0.61 eq/100 g

EXAMPLES 16-20 AND COMPARATIVE EXAMPLE 6

A stainless steel reactor equipped with a stirrer, reflux condenser and a nitrogen inlet tube was charged with the p-BAC-M-BMI obtained in Synthesis Example 1 and the aromatic amines set forth in Table 5 respectively, in the amount set forth in Table 5 and heat-melted at 180° C. for 20 minutes. The mixture was then defoamed at 150° C. for 30 minutes under a reduced pressure of 10 to 15 mm Hg and cooled to room temperature to obtain a resin composition of a transparent brown glassy solid.

A mold, previously heated to 180° C., was filled with the obtained compositions and subjected to simultaneous heat-melting. The mold was pressed under a pressure of 50 kg/cm$^2$ at 200° C. for 30 minutes. The molded product was removed from the mold after cooling to room temperature and further post-cured in an oven at 250° C. for 4 hours to obtain cured specimens having dimensions of 127 mm in length, 12.7 mm in width and 6.4 mm in thickness.

The heat distortion temperature, bending strength, flexural modulus and starting temperature of thermal decomposition of the specimens were measured. The appearance of a 50% solution of the resin was visually observed after storing for 30 days at room temperature. The results are set forth in Table 5.

COMPARATIVE EXAMPLE 7

The same procedures described in connection with Examples 16-20 were carried out except that 100 parts by weight of N,N'-4,4'-diphenylmethanebismaleimide and parts of 4,4'-diaminodiphenylmethane were used as set forth in Table 5. The results are set forth in Table 5.

COMPARATIVE EXAMPLE 8

The same procedures described in connection with Example 16-20 were carried out by using Kelimide-1050 manufactured by Nippon Polyimide Co. The results are set forth in Table 5.

TABLE 5

| | Resin Composition | | | | Bending Strength (kg/mm$^2$) | Flexural Modulus (kg/mm$^2$) | Heat Distion Temp. (°C.) | Starting Temp. of Thermal Decomposition (°C.) | Storage Stability 50 wt. % resin solution room temp. × 30 days |
|---|---|---|---|---|---|---|---|---|---|
| | Bismaleimide Compound of Synthesis Example 1 (wt. part) | | Aromatic Amine (III) (wt. part) | | | | | | |
| Example 16 | p-BAC-M-BMI* | 100 | II-a (Synthesis Ex. 3) | 5 | 13.4 | 415 | >300 | 382 | flowable |
| Example 17 | p-BAC-M-BMI* | 100 | II-a (Synthesis Ex. 3) | 10 | 14.0 | 372 | >300 | 376 | flowable |
| Example 18 | p-BAC-M-BMI* | 100 | II-a (Synthesis Ex. 3) | 20 | 15.5 | 359 | >300 | 364 | flowable |
| Example 19 | p-BAC-M-BMI* | 100 | II-a (Synthesis Ex. 3) | 30 | 15.0 | 350 | 291 | 351 | flowable |
| Example 20 | p-BAC-M-BMI* | 100 | II-b (Synthesis Ex. 4) | 20 | 15.7 | 354 | >300 | 365 | flowable |
| Comp. Ex. 6 | p-BAC-M-BMI* | 100 | none | 0 | 5.2 | 460 | >300 | 412 | flowable |
| Comp. Ex. 7 | N,N'-4,4'-diphenyl-methanebismaleimide | 100 | 4,4'-diamino-diphenyl-methane | 30 | 8.6 | 352 | 276 | 330 | gelation no flowability |
| Comp. Ex. 8 | Kelimide - 1050 | | | | 8.6 | 352 | 285 | 333 | gelation no flowability |

(Note):
*1,3-bis[4-(4-bismaleimidephenoxy)-α,α-dimethylbenzyl]benzene

What is claimed is:

1. A thermosetting resin forming composition comprising a bismaleimide compound represented by formula (I):

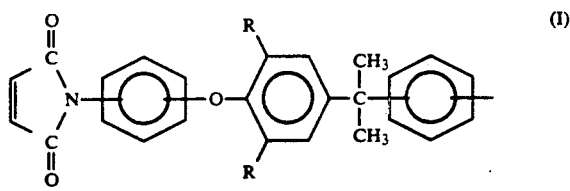

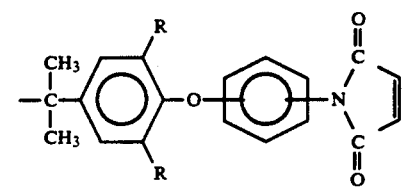

wherein R is a hydrogen atom or methyl, and a diamine compound represented by formula (II):

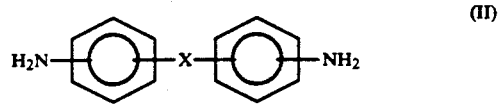

wherein X is a radical selected from the group of divalent hydrocarbons having from 1 to 10 carbon atoms, hexafluorinated isopropylidene carbonyl, thio, sulfinyl, sulfonyl, oxo,

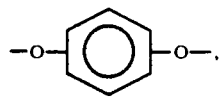

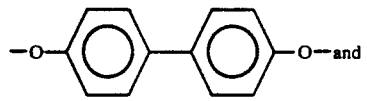

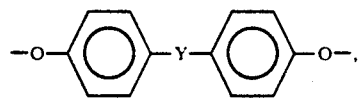

wherein Y a radical selected from the group of divalent hydrocarbons having from 1 to 10 carbon atoms, hexafluorinated isopropylidene, carbonyl, thio, sulfinyl, sulfonyl and oxo.

2. A composition according to claim 1, wherein the diamine compound represented by formula (II) is a compound represented by formula (VI):

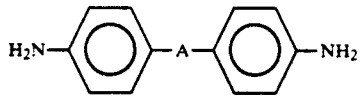 (VI)

wherein A is a radical selected from the group of divalent hydrocarbons having from 1 to 10 carbon atoms, hexafluorinated isopropylidene, carbonyl, thio, sulfinyl, sulfonyl and oxo.

3. A composition according to claim 2, wherein the compound represented by formula (VI) is 4,4'-diaminodiphenylmethane.

4. A composition according to claim 1, wherein the diamine compound represented by formula (II) is a compound represented by formula (VII):

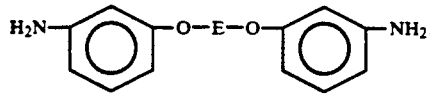 (VII)

wherein E is a divalent radical selected from

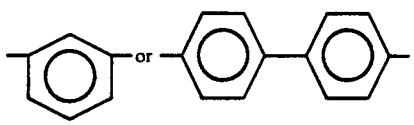

-continued

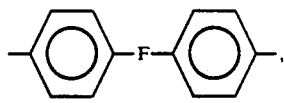

wherein F a radical selected from the group of divalent hydrocarbons having from 1 to 10 carbon atoms, hexafluorinated isopropylidene, carbonyl, thio, sulfinyl, sulfonyl and oxo.

5. A composition according to claim 1, wherein the bismaleimide compound represented by formula (I) is a bismaleimide compound of formula (V):

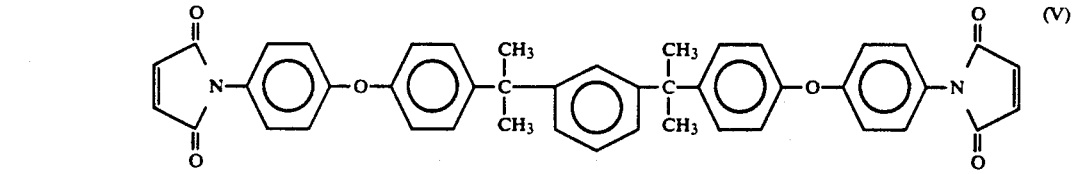 (V)

6. A composition according to claim 1, wherein the content of the diamine compound is from 0.1 to 1.2 moles, per mole of bismaleimide compound.

7. A composition according to claim 1, wherein the content of diamine compound is from 0.2 to 0.8 mole, per mole of bismaleimide compound.

8. A thermosetting resin forming composition comprising a bismaleimide compound represented by formula (I):

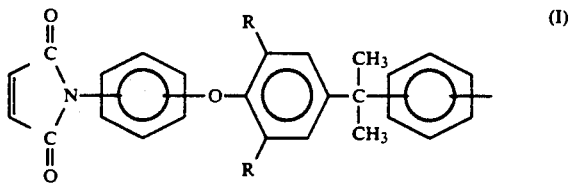 (I)

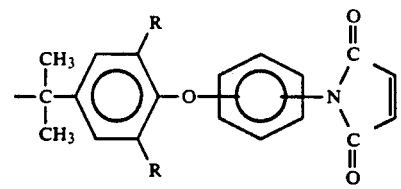

wherein R is a hydrogen atom or methyl, and an aromatic amine represented by formula (III):

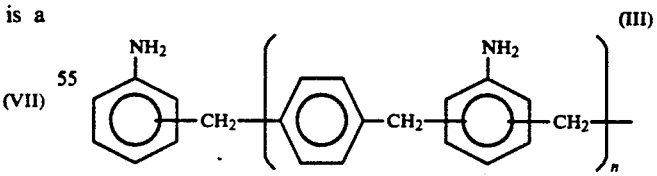 (III)

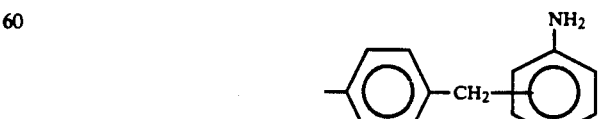

wherein n is an integer of from 0 to 50.

9. A composition according to claim 8, wherein the content of the aromatic amine is from 5 to 50 parts by weight, per 100 parts by weight of the bismaleimide compound.

10. A composition according to claim 8, wherein the content of the aromatic amine is from 5 to 30 parts by weight, per 100 parts by weight of the bismaleimide compound.

11. A composition according to claim 8, wherein the average molecular weight of aromatic amine is in the range of from 288 to 2200.

12. A process for preparing a thermosetting resin forming composition comprising, mixing a bismaleamide compound represented by formula (I):

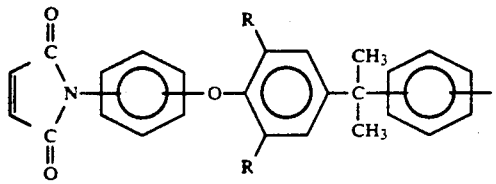

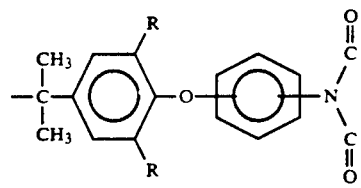

(I)

wherein R is a hydrogen atom or methyl, with a diamine compound represented by formula (II):

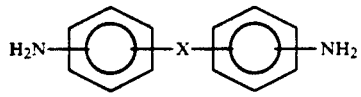

(II)

wherein X is a radical selected from the group of divalent hydrocarbons having from 1 to 10 carbon atoms, hexafluorinated isopropylidene, carbonyl, thio, sulfinyl, sulfonyl, oxo,

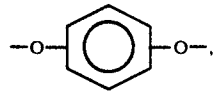

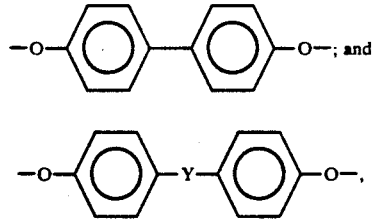

wherein Y a radical selected from the group of divalent hydrocarbons having from 1 to 10 carbon atoms, hexafluorinated isopropylidene, carbonyl, thio, sulfinyl, sulfonyl and oxo, either in the absence or presence of an organic solvent; and forming a prepolymer by conducting heat treatment at temperature of from 70° to 220° C.

13. A process according to claim 12, wherein the diamine compound represented by formula (II) is a compound represented by formula (VI):

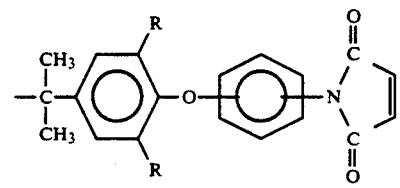

(VI)

wherein A is a radical selected from the group of divalent hydrocarbons having from 1 to 10 carbon atoms, hexafluorinated isopropylidene, carbonyl, thio, sulfinyl, sulfonyl and oxo.

14. A process for preparing a thermosetting resin forming composition comprising mixing a bismaleimide compound represented by formula (I)

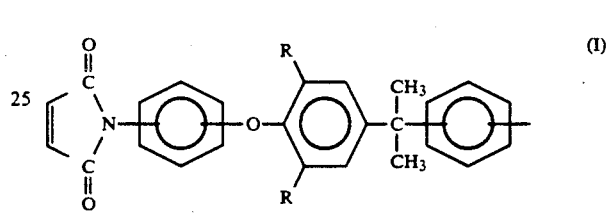

(I)

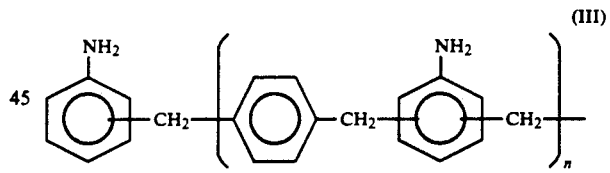

wherein R is a hydrogen atom or methyl, with an aromatic amine represented by formula (III):

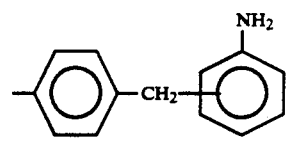

(III)

wherein n is an integer of from 0 to 50, either in the absence or presence of an organic solvent; and forming a prepolymer by conducting heat treatment at temperature of from 70° to 220° C.

* * * * *

UNITED STATES PATENT AND TRADEMARK OFFICE
CERTIFICATE OF CORRECTION

PATENT NO. : 5,106,937
DATED : April 21, 1992
INVENTOR(S) : Yamaya et al.

It is certified that error appears in the above-identified patent and that said Letters Patent is hereby corrected as shown below:

In column 15, line 3, after "isopropylidene" insert --,--.

In column 15, line 65, delete "or" and insert therefor --,--.

In column 16, line 1, before the formula, insert --or--.

Signed and Sealed this

Ninth Day of November, 1993

Attest:

BRUCE LEHMAN

Attesting Officer

Commissioner of Patents and Trademarks